(12) United States Patent
Urabe et al.

(10) Patent No.: US 7,829,198 B2
(45) Date of Patent: Nov. 9, 2010

(54) LENS FOR SPECTACLES AND METHOD FOR FORMING LENS FOR SPECTACLES

(75) Inventors: Masanobu Urabe, Kawasaki (JP); Tsukasa Monma, Kawasaki (JP); Osamu Abe, Yokohama (JP); Toru Yashiro, Yokohama (JP)

(73) Assignee: Nikon-Essilor Co., Ltd, Tokyo (JP)

( * ) Notice: Subject to any disclaimer, the term of this patent is extended or adjusted under 35 U.S.C. 154(b) by 39 days.

(21) Appl. No.: 11/885,043

(22) PCT Filed: Feb. 28, 2006

(86) PCT No.: PCT/JP2006/303679

§ 371 (c)(1),
(2), (4) Date: Dec. 11, 2008

(87) PCT Pub. No.: WO2006/093113

PCT Pub. Date: Sep. 8, 2006

(65) Prior Publication Data

US 2009/0213322 A1     Aug. 27, 2009

(30) Foreign Application Priority Data

Mar. 3, 2005     (JP) .............................. 2005-058397

(51) Int. Cl.
*B32B 5/16*     (2006.01)
(52) U.S. Cl. ...................................... 428/546; 428/544
(58) Field of Classification Search ................. 351/159, 351/177, 178; 428/546, 544, 548, 626, 457, 428/615, 523, 542, 522, 341
See application file for complete search history.

(56) References Cited

U.S. PATENT DOCUMENTS

| | | | |
|---|---|---|---|
| 6,235,407 B1 * | 5/2001 | Ogata et al. | 428/626 |
| 6,277,507 B1 * | 8/2001 | Anzaki et al. | 428/702 |
| 2002/0176988 A1 | 11/2002 | Medwick et al. | |

(Continued)

FOREIGN PATENT DOCUMENTS

GB     2 145 640 A     4/1985

(Continued)

OTHER PUBLICATIONS

Office Action from Canadian Intellectual Property Office for Canadian Application 2,599,918, mailed on Jul. 23, 2009.

*Primary Examiner*—Hung X Dang
(74) *Attorney, Agent, or Firm*—Finnegan, Henderson, Farabow, Garrett & Dunner, L.L.P.

(57) ABSTRACT

An oil-repellent coating layer 2 is disposed on both surfaces of a lens material 1 consisting of glass or a plastic. Furthermore, a minute particle layer 3 in which minute particles of a metal oxide or minute particles of a fluoride, or both, are dispersed is formed on the surface of the oil-repellent coating layer 2, and a resin layer 4 consisting of an organic compound is disposed on the surface of the minute particle layer 3. Since the adhesion between the resin layer 4 and the two-sided adhesive tape that is used when the lens is set in the lens edging machine is good, axial shifting tends not to occur during working.

13 Claims, 4 Drawing Sheets

U.S. PATENT DOCUMENTS

2003/0049370 A1    3/2003    Lacan et al.
2006/0051501 A1    3/2006    Conte et al.

FOREIGN PATENT DOCUMENTS

| | | |
|---|---|---|
| GB | 2 209 292 A | 5/1989 |
| JP | 2004-061879 | 2/2004 |
| JP | 2004-157147 | 6/2004 |
| JP | 2004-170962 | 6/2004 |
| JP | 2004-347660 | 12/2004 |
| JP | 2005-003817 | 6/2005 |
| WO | WO 2004/046791 A1 | 3/2004 |
| WO | WO 2005/015270 A1 | 2/2005 |

* cited by examiner

Tool used to evaluate amount of axial shifting

LENS FOR SPECTACLES AND METHOD FOR FORMING LENS FOR SPECTACLES

TECHNICAL FIELD

The present means relates to a lens edging method in which an eyeglass lens coated with an oil-repellent coating is subjected to external shape (external circumference) working so as to match an eyeglass frame, and an eyeglass lens that is suitable for use in this working method.

BACKGROUND ART

Generally, eyeglass lenses are subjected to working of the external shape so as to match the shape of eyeglass frames selected by the customer at a retail shop, and are then placed in the eyeglass frames and handed over to the customer. Working machines that are used to perform such working of the external circumference of the lens are called lens edging machines (edgers, outer edge working machines, or the like). In commonly used lens edging machines, working of the external shape is accomplished by grinding the outer edge of the lens with a grinding tool while the eyeglasses are clamped by a working shaft.

A schematic diagram of this working method is shown in FIG. 6. The lens 21 that is to be worked is first fastened to a locking cap 22 made of plastic by a piece of two-sided adhesive tape 23. Specifically, this two-sided adhesive tape 23 is bonded beforehand to the locking cap 22, and the other side of the tape is bonded to surface of the lens 21 that is to be worked, so that the lens 21 that is to be worked is fastened to the locking cap 22. Then, this locking cap 22 is fastened to an upper-side lens working shaft 24.

Next, this lens 21 that is to be worked is fastened in place by being clamped between a lower-side lens working shaft 25 and the locking cap 22. In this state, a grinding tool 26 is caused to move along the outer circumference of the lens 21 that is to be worked while this grinding tool 26 is rotated, and working of the outer circumference of the lens 21 that is to be worked is performed. There are also cases in which such lens edging is performed at the maker's factory rather than at a retail shop.

In recent years, eyeglass lenses in which the surfaces of the eyeglass lenses are coated with an oil-repellent coating have been marketed. Such lenses tend to resist the adhesion of contaminants to the surface, and are therefore favorably evaluated by eyeglass users. However, during lens edging, since the frictional resistance of the surface is low, the following problem arises in cases where a holding method for conventional eyeglass lenses that do not have an oil-repellent coating is used: namely, the lens working shaft and the lens axis tend to shift during working, so that there may be cases in which the working of the external shape cannot be accurately performed.

DISCLOSURE OF THE INVENTION

The present invention was devised in the light of such circumstances; it is an object of the present invention to provide an eyeglass lens working method which makes it possible to perform lens edging using the same holding method as that used for conventional lenses, even in the case of eyeglass lenses that are coated with an oil-repellent coating, and an eyeglass lens that is suitable for use in this working.

The first means that is used to solve the problem described above is an eyeglass lens in which an anti-reflection film, an oil-repellent film, and an anti-slip film are formed on the lens surface in that order from the side of the lens surface, and the anti-slip film comprises a first layer which is disposed on the surface of the oil-repellent film, and in which minute particles of a metal oxide or minute particles of a fluoride, or both, are dispersed, and a second layer formed from a resin consisting of an organic compound which is disposed on the surface of the first layer.

In this means, an anti-slip film is disposed on the oil-repellent film on one or both sides. The resin consisting of an organic compound that forms the outermost layer (second layer) of the anti-slip film shows good adhesion with the two-sided adhesive tape; accordingly, no shifting is generated between this resin and the two-sided adhesive tape. Consequently, it is possible to prevent axial shifting that would be a substantial problem occurring between the lens working shaft and the axis of the lens in cases where the two-sided adhesive tape is bonded directly to the surface of the oil-repellent film.

However, the oil-repellent film and the resin consisting of an organic compound show a poor affinity, and even if it is attempted to coat the surface of the oil-repellent film directly with this resin consisting of an organic compound, this coating cannot be accomplished in a favorable manner. Accordingly, in this means, a layer (first layer) in which minute particles of a metal oxide or minute particles of a fluoride, or both, are dispersed is disposed between the two films. As a result, the oil-repellent film and the resin consisting of an organic compound can be joined; furthermore, slipping between the two films can be prevented. Moreover, the layer in which minute particles of a metal oxide and minute particles of a fluoride, or both, are dispersed, also has the function of preventing slipping with the oil-repellent film.

Furthermore, since there are no oil-repellent properties in the resin consisting of an organic compound that is formed on the outermost surface, this is suitable for the printing of working information required for frame insertion of a progressive focal lens or the like on the lens surface.

In addition, after the lens edging is completed, the resin layer consisting of an organic compound and the layer in which minute particles of a metal oxide or minute particles of a fluoride, or both, are dispersed can easily be stripped from the lens together with a cellophane tape or the like by bonding such a cellophane tape to the surface of the resin layer consisting of an organic compound, and then stripping this tape, and there is no scratching of the lens surface (surface of the coating layer having oil-repellent properties) during this stripping.

Conventionally, furthermore, a locking cap has been pressed against the oil-repellent film, either directly or via a two-sided adhesive tape; consequently, the problem of cracking of the oil-repellent film has been encountered. In the present means, however, since the locking cap is pressed against a resin consisting of an organic compound via a two-sided adhesive tape, the occurrence of such cracking can also be prevented.

Moreover, in the present means (and corresponding claim), the oil-repellent eyeglass lens in which an anti-reflection film, oil-repellent film, and anti-slip film are disposed on the lens surface in that order from the side of the lens surface includes not only eyeglass lenses in which the anti-reflection film is disposed directly on the lens surface, but also eyeglass lenses in which films having other functions are formed between the lens surface and the anti-reflection film.

The second means that is used to solve the problem described above is an eyeglass lens in which an anti-reflection film, an oil-repellent film, and an anti-slip film are disposed on the lens surface in that order from the side of the lens surface, and the anti-slip film comprises a mixture of minute particles of a metal oxide or minute particles of a fluoride, or both, and a resin consisting of an organic compound, with this mixture being disposed on the surface of the oil-repellent film.

In the first means, the system was devised so that a layer (second layer) comprising a resin consisting of an organic compound was formed on the surface of a layer (first layer) in which minute particles of a metal oxide or minute particles of a fluoride, or both, were dispersed. In the present means, however, these two layers are combined into a single mixed layer. Operational effects equivalent to those of the first means are also obtained in the present means. In the first means, when the coating agent in which minute particles of a metal oxide or minute particles of a fluoride, or both, are dispersed is dried, the minute particles tend to come out. In the present means, however, since the particles are dispersed in a resin, such a problem is eliminated. In this case, furthermore, it is necessary that the solvent of the coating agent be a solvent that can dissolve resins consisting of organic compounds.

In the present means (and corresponding claim), furthermore, the eyeglass lens in which an anti-reflection film, oil-repellent film, and anti-slip film are disposed on the lens surface in that order from the side of the lens surface includes not only eyeglass lenses in which the anti-reflection film is formed directly on the lens surface, but also eyeglass lenses in which films having other functions are formed between the lens surface and the anti-reflection film.

The third means that is used to solve the problem described above is the first or second means, wherein the surface of the anti-reflection film has fine indentations and projections of 10 nm or less.

In the present means, the surface of the anti-reflection film formed on the surface of the lens has fine indentations and projections of 10 nm or less. As a result of the formation of these fine indentations and projections of 10 nm or less in the surface of the anti-reflection film, the surface area of the anti-reflection film is increased, and the adhesion with the coating having oil-repellent properties is increased. Furthermore, the degree to which the minute particles of a metal oxide or minute particles of a fluoride that are applied as a coating to the surface of the coating having oil-repellent properties bite into the coating having oil-repellent properties is increased, and slipping can therefore be reduced.

Effective methods for forming indentations and projections into the surface structure of the anti-reflection film include the following:

(1) Methods in which a gas such as oxygen is introduced during vacuum evaporation.

(2) Methods in which the vacuum evaporation rate is set at a rapid rate.

(3) Methods in which the temperature of the plastic lens is controlled to a low temperature during vacuum evaporation.

(4) Methods in which ion beam irradiation is performed following the completion of vacuum evaporation.

(5) Methods in which irradiation with a plasma or the like is performed following vacuum evaporation.

The fourth means that is used to solve the problem described above is any of the first through third means, wherein the mean particle size of the minute particles of a metal oxide and minute particles of a fluoride is 100 nm or less.

In cases where the lens edging is performed by an automated process, a method is employed in which the position of the lens that is being worked is detected by transmitting light through the lens that is being worked. If the mean particle size of the minute particles of a metal oxide and minute particles of a fluoride exceeds 100 nm, the transmissivity of visible light in the layer in which these particles are dispersed is poor, and there is a possibility that the position detection system will not work well. Accordingly, it is desirable that the mean particle size of these minute particles be 100 nm or less.

The fifth means that is used to solve the problem described above is any of the first through fourth means, wherein the metal oxide is a metal oxide of Si, Al, Sn, Sb, Ta, Ce, La, Fe, Zn, W, Zr, In, Ti or Nb, or a complex metal oxide constructed from two or more of these metal oxides.

Since these metal oxides have wettability on the surface, the adhesion with the two-sided adhesive tape is good; furthermore, these are suitable for the printing of working information required for frame insertion of a progressive focal lens or the like on the lens surface using an oil-based ink.

The sixth means that is used to solve the problem described above is any of the first through fifth means, wherein the fluoride is a fluoride of Mg, Al, K, Ca, Ba or Sr, or a complex fluoride constructed from two or more of these fluorides.

Fluorides of these substances have wettability on the surface; accordingly, the adhesion with the two-sided adhesive tape is good; furthermore, these are suitable for the printing of working information required for frame insertion of a progressive focal lens or the like on the lens surface using an oil-based ink.

The seventh means that is used to solve the problem described above is any of the first through sixth means, wherein the resin consisting of an organic compound is one or more resins comprising mainly an acrylic resin, epoxy resin, silicon[e] resin, urethane resin, urea resin, melamine resin, alkyd resin, polyester resin, synthetic rubber, phenol resin, polyvinyl acetal resin, fluorine resin, polyamide resin, unsaturated polyester resin, cellulose polymer, polyalkylene oxide polymer, polyvinyl acetate polymer, styrene/methacrylic acid ester copolymer, or other vinyl (co)polymer.

The resins consisting of organic compounds show an especially good adhesion with the two-side adhesive tape, and can effectively prevent shifting between the lens working shaft and the axis of the lens.

The eighth means that is used to solve the problem described above is an eyeglass lens working method in which the edge portions of an eyeglass lens that has an anti-reflection film formed on the lens surface and that has a coating having oil-repellent properties applied to the surface of this anti-reflection film are worked by a lens edging machine, wherein this method has a step in which an anti-slip thin film is formed on the surface of at least one oil-repellent coating film on the surface of the eyeglass lens by (A) a method in which a coating liquid obtained by having minute particles of a metal oxide or minute particles of a fluoride, or both, dispersed is applied as a coating and dried, and a resin consisting of an organic compound is applied to the surface of this film as a coating and dried, or (b) a method in which a coating liquid comprising a mixture of minute particles of a metal oxide or minute particles of a fluoride, or both, and a resin consisting of an organic compound, is applied as a coating and dried, and the surface of the anti-slip thin film of this eyeglass lens is then set in the lens edging machine with a two-sided adhesive tape interposed.

BEST MODE FOR CARRYING OUT THE INVENTION

Figure 1:
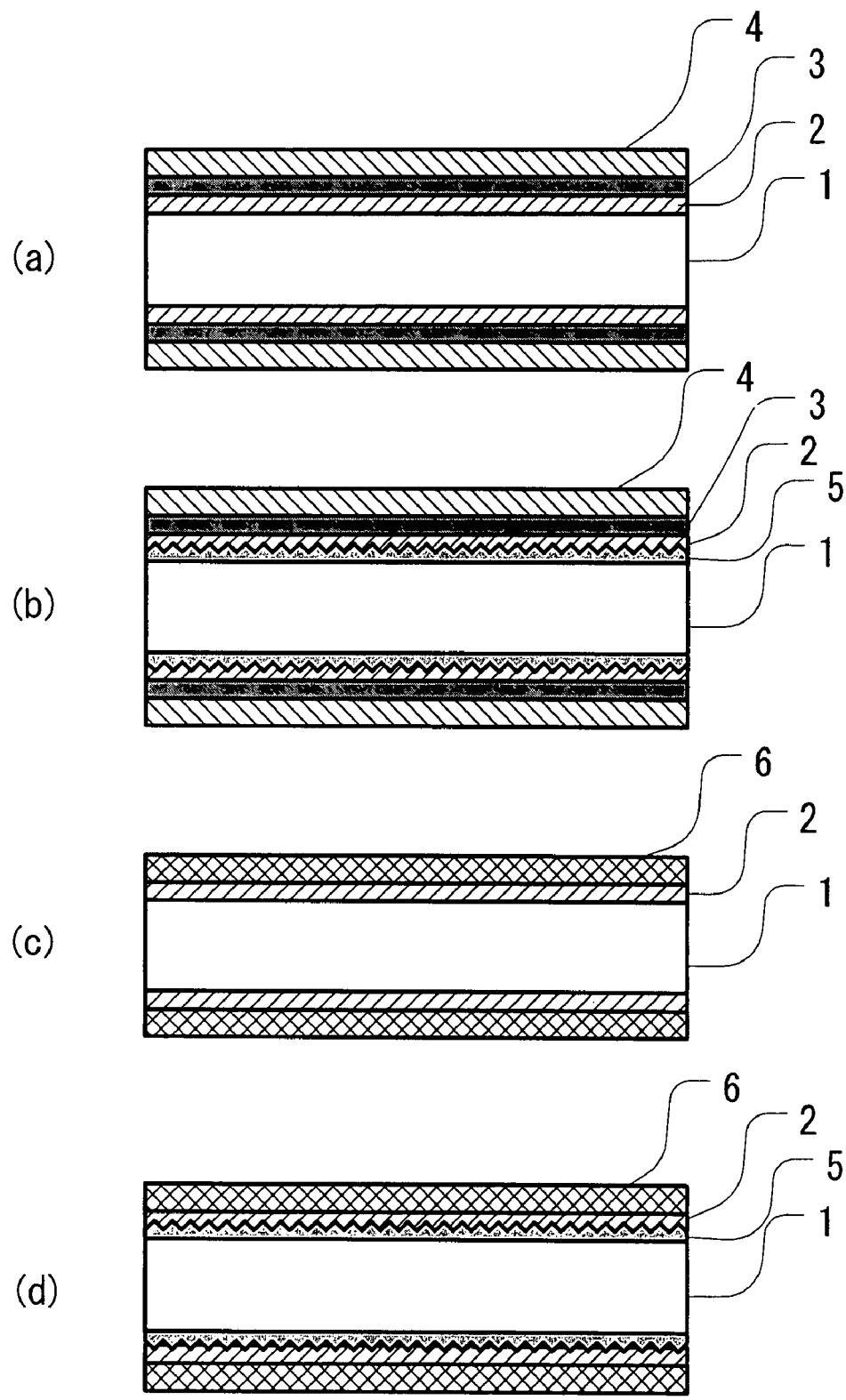
FIG. 1 is a schematic diagram showing an outline of an eyeglass lens constituting a working configuration of the present invention.

Working configurations of the present invention will be described below using the figures. FIG. 1 is a schematic diagram showing an outline of an eyeglass lens constituting a working configuration of the present invention. Since this is a schematic diagram, the thicknesses of the respective films do not express the actual dimensions. Furthermore, the surface shape of the lens is ordinarily a curved surface shape with indentations and projections; in FIG. 1, however, a flat surface is shown for the sake of simplicity.

In the construction shown in (a), an oil-repellent coating layer 2 is formed on both surfaces of a lens material 1 consisting of glass or plastic. Furthermore, a minute particle layer 3 in which minute particles of a metal oxide or minute particles of a fluoride, or both, are dispersed is formed on the surface of the oil-repellent coating layer 2, and a resin layer 4 consisting of an organic compound is further formed on the surface of the minute particle layer 3. This minute particle layer 3 and resin layer 4 constitute an anti-slip layer.

In order to form the minute particle layer 3, a method can be employed in which a coating liquid obtained by having minute particles of a metal oxide or minute particles of a fluoride, or both, dispersed in a solvent is prepared, this coating liquid is applied as a coating by (for example) a spin coating method, dipping method, spray method, or flow coating method, and this coating is then dried by irradiation with infrared radiation or far-infrared radiation, or by blowing a hot air draft so that the solvent is evaporated, thus leaving the minute particles.

In order to form the resin layer 4, a method is conceivable in which a resin consisting of a liquid organic compound is applied as a coating by (for example) a spin coating method, dipping method, spray method, or flow coating method, and this coating is then dried by irradiation with infrared radiation, far-infrared radiation, or ultraviolet radiation, or by blowing a hot air draft so that the coating is solidified.

As was already described, the resin layer 4 that is formed on the outermost surface shows better adhesion with the two-sided adhesive tape than the oil-repellent coating layer 2. Accordingly, shifting of the lens during lens edging tends not to occur. Furthermore, as a result of the formation of the minute particle layer 3, the adhesion between the oil-repellent coating layer 2 and the resin layer 4 can be improved, so that shifting between the oil-repellent coating layer 2 and resin layer 4 can be prevented.

The construction shown in (b) differs from that shown in (a) only in that an anti-reflection film 5 having minute indentations and projections with a fine pitch of 10 nm or less in the surface is formed between the lens material 1 and the oil-repellent coating layer 2. The operational effects are substantially the same as those of (a); as was already described, an effect whereby the surface area of the anti-reflection film 5 is increased, and the adhesion with the coating having oil-repellent properties is increased, and an effect whereby the degree to which the minute particles of a metal oxide or the minute particles of a fluoride that are applied as a coating to the surface of the coating having oil-repellent properties bite into the coating having oil-repellent properties is increased, so that slipping can be reduced, are additionally obtained.

The construction shown in (c) differs from that shown in (a) in that a resin layer 6 containing minute particles in which the minute particle layer 3 and resin layer 4 are combined into a single integral unit is formed instead of the minute particle layer 3 and resin layer 4. This resin layer 6 containing minute particles constitutes an anti-slip layer. In order to form the resin layer 6 containing minute particles, a method can be employed in which a coating liquid obtained by having minute particles of a metal oxide or minute particles of a fluoride, or both, contained in a resin is prepared, this coating liquid is applied as a coating by (for example) a spin coating method, dipping method, spray method, or flow coating method, and this coating is then dried by irradiation with infrared radiation, far-infrared radiation, or ultraviolet radiation, or by blowing a hot air draft so that the resin is hardened. The operational effects are substantially the same as those indicated in (a).

The construction indicated in (d) differs from that indicated in (b) in that a resin layer 6 containing minute particles in which the minute particle layer 3 and resin layer 4 are combined into a single integral unit is formed instead of the minute particle layer 3 and resin layer 4. The method for forming the resin layer 6 containing minute particles is the same as that indicated in (c), and the operational effects are substantially the same as those indicated in (b).

Furthermore, in (a) through (d), the minute particle layer 3, resin layer 4, and resin layer 6 containing minute particles are formed on both sides of the lens; however, it would also be possible to manifest an effect even if these layers were formed on only one side of the lens.

Moreover, the anti-slip layer may also be formed over the entire refractive surface of the eyeglass lens; however, it is likewise possible to form this layer partially in equal to or greater than the area range in which the two-sided adhesive tape is bonded during working. Furthermore, it is desirable that the thickness of the resin layer consisting of an organic compound be 0.1 to 100 μm, and a thickness of 2 to 20 μm is even more desirable. In addition, a surfactant can also be added to the resin layer during coating in order to realize uniformity of the coating film, and the anti-slip coating layer can also be colored by the addition of a dye, pigment, or the like in order to make the presence of this layer more evident.

Figure 2:
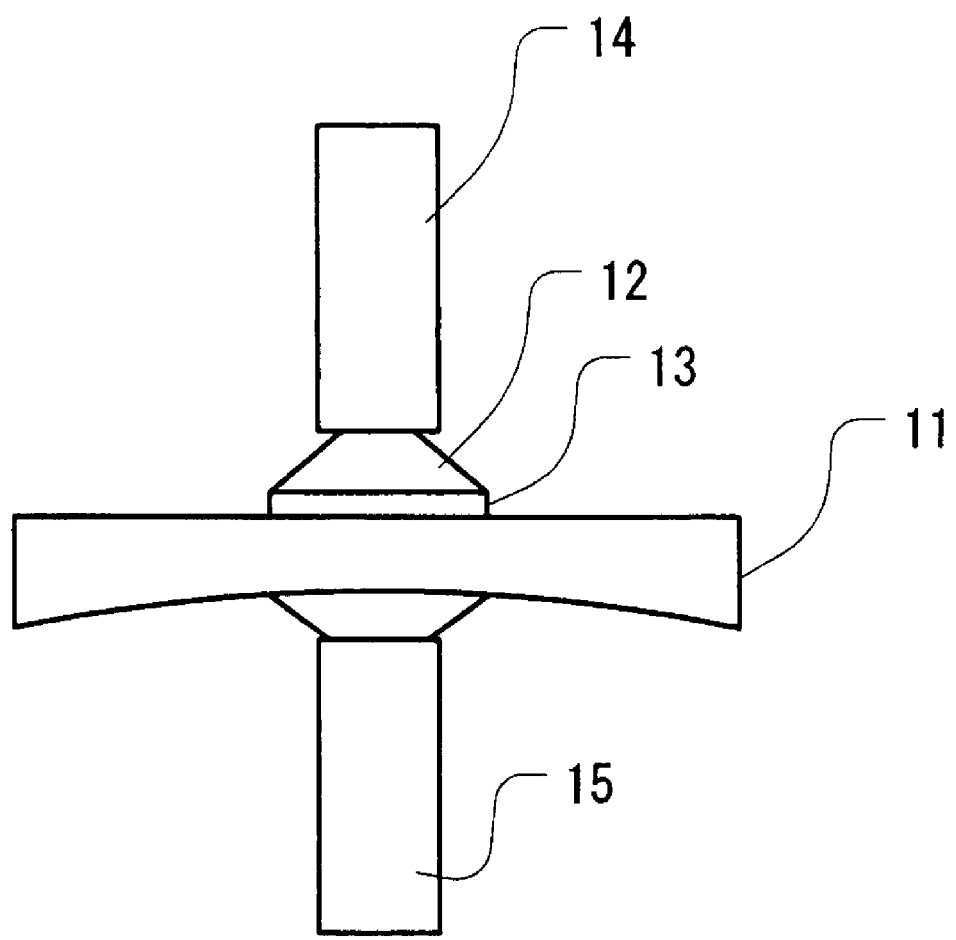
FIG. 2 is a diagram used to illustrate the concept of a lens edging method for an eyeglass lens with an oil-repellent coating constituting a working configuration of the present invention.

FIG. 2 is a diagram used to illustrate the concept of a lens edging method for an eyeglass lens with an oil-repellent coating constituting a working configuration of the present invention. First, as is shown in FIG. 2, a lens 11 that is to be worked such as that shown in FIGS. 1(a) through 1(d) is fastened to a locking cap 12 by means of a two-sided adhesive tape 13 in the same manner as in a conventional technique as shown in FIG. 2. The two-sided adhesive tape 13 is bonded to the locking cap 12 beforehand, and the other side of the tape] is bonded to the surface of the lens 11 that is to be worked, so that the lens 11 that is to be worked is fastened to the locking cap 12. Then, this locking cap 12 is fastened to the upper-side lens working shaft 14. Next, this lens 11 that is to be worked is clamped and fastened between the lower-side lens working shaft 15 and the locking cap 12.

In this case, since no two-sided adhesive tape is disposed on the lower-side lens working shaft 15, it is not absolutely necessary that layers such as the minute particle layer 3, resin layer 4, resin layer 6 containing minute particles be disposed on the lower side of the lens 11 that is to be worked; however, in cases where such layers are disposed, slipping between the lower-side lens working shaft 15 and the lens 11 that is to be worked is eliminated. Accordingly, the disposition of such layers is desirable.

Figure 6:
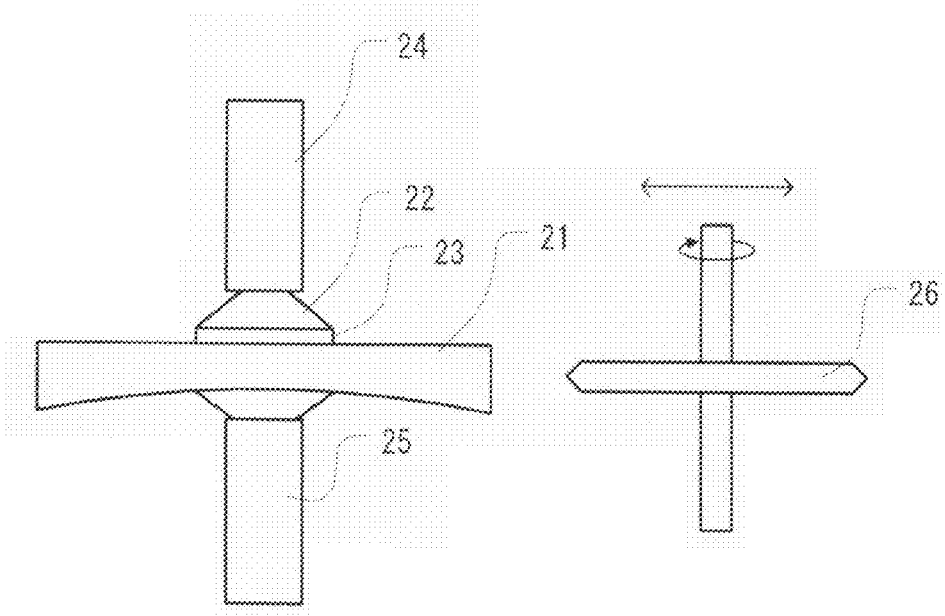
FIG. 6 is a diagram showing an outline of a conventional lens edging method.

In this state, working of the outer circumference of the lens 11 that is to be worked is performed by means of a grinding tool (not shown in the figure; this tool is the same as that shown in FIG. 6).

As was described above, since a two-sided adhesive tape 13 of the type described above is bonded to the surface of the resin layer 4 consisting of an organic compound or the resin layer 6 containing minute particles, the two-sided adhesive tape 13 and lens 11 that is being worked are fastened without any slipping between the two even in cases where the lens 11 that is being worked is coated with an oil-repellent coating 2. Accordingly, the lens 11 that is being worked is firmly fastened between the upper-side lens working shaft 14 and lower-side lens working shaft 15 via the locking cap 12, so that the occurrence of axial shifting during working can be prevented.

EMBODIMENTS

Embodiments and comparative examples of the present invention will be described below; however, it goes without saying that the claims of the present application are not limited to these examples. The coating liquids used in these embodiments and comparative examples are shown below.

1. Coating Liquid A (Liquid Containing Minute Particles of a Fluoride Dispersed in a Resin)

50 wt parts of an ultraviolet-curable resin U-413 (urethane type acrylic resin manufactured by Chemitech Inc.) was added to 100 wt parts of magnesium fluoride dispersed in methanol (10 wt %, manufactured by Nissan Chemical Industries, Ltd.); then, 100 wt parts of 1-methoxy-2-propanol (special grade) manufactured by Wako Pure Chemical was further added to this, and this mixture was thoroughly agitated.

2. Coating Liquid B (Liquid Containing Minute Particles of a Metal Oxide Dispersed in a Resin)

50 wt parts of an ultraviolet-curable resin 5×634 (urethane type acrylic resin manufactured by Chemitech Inc.) was added to 100 wt parts of a tin type sol dispersed in methanol (HIS-30M manufactured by Nissan Chemical Industries, Ltd., solid content 30%); then, 100 wt parts of 1-methoxy-2-propanol (special grade) manufactured by Wako Pure Chemical was further added to this, and this mixture was thoroughly agitated.

3. Coating Liquid C (Liquid Containing Minute Particles of a Metal Oxide Dispersed in a Solvent)

100 wt parts of isopropyl alcohol (special grade) manufactured by Wako Pure Chemical was added to 100 wt parts of a methanol silica sol (30 wt %, manufactured by Nissan Chemical Industries, Ltd.), and this mixture was thoroughly agitated.

4. Coating Liquid D (Resin Consisting of an Organic Compound)

100 wt parts of 1-methoxy-2-propanol (special grade) manufactured by Wako Pure Chemical was added to 50 wt parts of an ultraviolet-curable resin U-413 (manufactured by Chemitech Inc.), and this mixture was thoroughly agitated.

5. Coating Liquid E (Liquid Containing Minute Particles of a Metal Oxide Dispersed in a Resin)

50 wt parts of S-LEC BM-5 (polyvinylbutyral resin manufactured by Sekisui Chemical Co.) was dissolved in a mixed solution of 150 wt parts of methanol and 150 wt parts of 1-methoxy-2-propanol (special grade) manufactured by Wako Pure Chemical; then, 100 wt parts of a methanol silica sol (manufactured by Nissan Chemical Industries, Ltd., solid content 30 wt %) was further added to this, and this mixture was thoroughly agitated.

Embodiment 1

A silicon[e] type hard coating having a refractive index of 1.67 was formed on the surface of a plastic eyeglass lens having a refractive index of 1.67, a diopter of −6.00, and an external diameter of 80 mm, and an anti-reflection film was further formed on the surface of this coating by a vacuum evaporation method. In terms of optical film thickness, the film construction of the anti-reflection film was as follows: namely, from the side of the lens substrate, the thickness of a combined film of $SiO_2/ZrO_2/SiO_2$ was $\lambda/4$, the thickness of a $ZrO_2$ layer was $\lambda/4$, and the thickness of an $SiO_2$ layer was $\lambda/4$ ($\lambda=500$ nm). Film formation was performed by introducing oxygen gas during the formation of the outermost $SiO_2$ layer, with the degree of vacuum set at $2\times10^{-5}$ Torr.

When the indentations and projections in the surface of the lens equipped with an anti-reflection film thus obtained were measured using a scanning probe microscope NanoScope IV (manufactured by Digital Instruments, Inc.), the following results were obtained:

$Ra$(mean roughness)=0.8 nm $R$max(maximum roughness)=8.0 nm

Furthermore, the surface of this lens equipped with an anti-reflection film was coated with an oil-repellent film (Optool-DSX manufactured by Daikin) by a dipping method. The convex surface side (one side) of the eyeglass lens equipped with an oil-repellent film thus prepared was coated with coating liquid A by spin coating.

The coating conditions were as follows: namely, 5 ml of the coating liquid was applied dropwise from the center of the lens surface by means of a dropper, and spin coating was performed for 15 seconds at a rotational speed of 500 rpm; then, the lens was further rotated for 60 seconds at a rotational speed of 200 rpm so that the lens was dried. Subsequently, the lens was heated for 10 minutes in a heating oven at 40° C. Then, with the convex surface facing upward, the coating was hardened by means of an ultraviolet irradiation device (ECS-151U manufactured by Eyegraphic Co.) with the conveyor speed and lamp height adjusted so that the amount of ultraviolet irradiation was 1000 $mJ/cm^2$.

Following hardening, dots were marked by means of a lens meter on three points on the convex surface of the lens, including one point passing through the optical center. Subsequently, on the concave surface of the lens, a straight line passing through the three dots marked on the convex surface as seen from the side of the concave surface, and a line which passes through the point passing through the optical center, and which was perpendicular to the straight line mentioned above, were marked with a cutter knife.

A two-sided adhesive tape (LEAPII manufactured by Sumitomo 3M) was bonded to the convex surface of the lens that had gone through the process described above using a centering device manufactured by Nidek so that the lens locking cap was positioned at the optical center of the lens, and lens edging was performed with the lens locking cap being engaged with one working shaft and the lens locking cap being clamped by the other working shaft.

Furthermore, the following three types of machines were used as working machines:

1. SE9090 manufactured by Nidek (ordinary-load machine containing two grindstones)

2. LE9000 manufactured by Nidek (ordinary-load machine containing one grindstone)

3. ALE5000 manufactured by Topcon (ordinary-load machine containing one grindstone)

Figure 3:
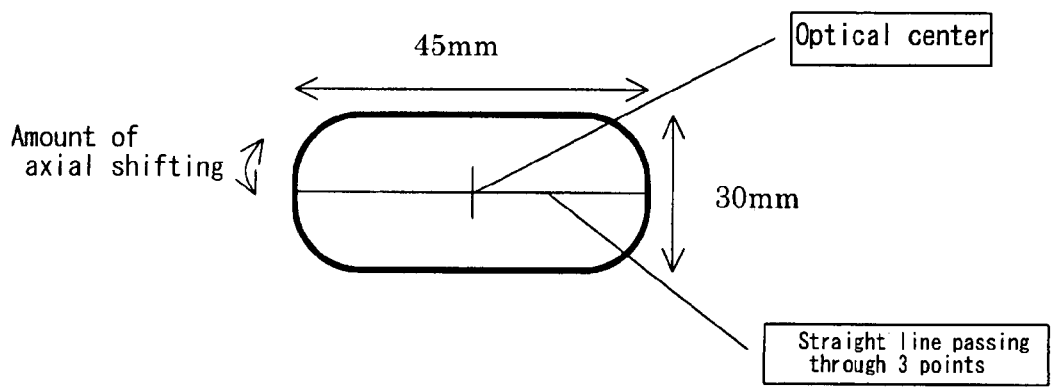
FIG. 3 is a diagram showing the relationship of the shape of the lens used in the embodiments and the amount of axial shift.

Moreover, the working shape of the lens was an eye-shaped lens as shown in FIG. 2; this shape is the same in the following embodiments and comparative examples. In addition, as is shown in FIG. 3, the amount of axial shift is an amount indicating the variation in the straight line passing through the three points described above before and after the working of the lens.

Embodiment 2

The convex surface side (one side) of an eyeglass lens equipped with an oil-repellent film prepared in the same manner as in Embodiment 1 was coated with coating liquid B by spin coating.

The coating conditions were as follows: namely, 5 ml of the coating liquid was applied dropwise from the center of the lens by means of a dropper, and spin coating was performed for 15 seconds at a rotational speed of 500 rpm; then, the lens was further rotated for 60 seconds at a rotational speed of 2000 rpm so that the lens was dried. Subsequently, the lens was heated for 10 minutes in a heating oven at 40° C. Then, with the convex surface facing upward, the coating was hardened by means of an ultraviolet irradiation device (ECS-151U manufactured by Eyegraphic Co.) with the conveyor speed and lamp height adjusted so that the amount of ultraviolet irradiation was 1000 mJ/cm$^2$.

Following hardening, dots were marked by means of a lens meter on three points on the convex surface, including one point passing through the optical center of the lens. Subsequently, the same operation as in Embodiment 1 was performed.

Comparative Example 1

The convex surface side (one side) of an eyeglass lens equipped with an oil-repellent film prepared in the same manner as in Embodiment 1 was coated with coating liquid C by spin coating.

The coating conditions were as follows: namely, 5 ml of the coating liquid was applied dropwise from the center of the lens by means of a dropper, and spin coating was performed for 15 seconds at a rotational speed of 500 rpm; then, the lens was dried for 60 seconds at a rotational speed of 2000 rpm. Subsequently, the lens was heated for 10 minutes in a heating oven at 40° C.; the lens was then removed from the oven, and the surface of the lens was returned to ordinary temperature. Afterward, dots were marked by means of a lens meter on three points on the convex surface, including one point passing through the optical center of the lens. The subsequent operation was the same as in Embodiment 1.

Comparative Example 2

The convex surface side (one side) of an eyeglass lens equipped with an oil-repellent film prepared in the same manner as in Embodiment 1 was coated with coating liquid D by spin coating.

The coating conditions were as follows: namely, 5 ml of the coating liquid was applied dropwise from the center of the lens by means of a dropper, and spin coating was performed for 15 seconds at a rotational speed of 500 rpm; then, the lens was dried for 60 seconds at a rotational speed of 2000 rpm. Subsequently, with the convex surface facing upward, the coating was hardened by means of an ultraviolet irradiation device (ECS-151U manufactured by Eyegraphic Co.) with the conveyor speed and lamp height adjusted so that the amount of ultraviolet irradiation was 1000 mJ/cm$^2$. The coating film was not uniformly formed on the lens surface, and the coating was missing in places. After hardening, dots were marked by means of a lens meter on three points, including one point passing through the optical center of the lens. The subsequent operation was the same as in Embodiment 1.

Embodiment 3

The convex surface side (one side) of an eyeglass lens equipped with an oil-repellent film prepared in the same manner as in Embodiment 1 was coated with coating liquid C by spin coating.

The coating conditions were as follows: namely, 5 ml of the coating liquid was applied dropwise from the center of the lens by means of a dropper, and spin coating was performed for 15 seconds at a rotational speed of 500 rpm; then, the lens was dried for 60 seconds at a rotational speed of 2000 rpm. Subsequently, the lens was heated for 10 minutes in a heating oven at 40° C.; the lens was then removed from the oven, and the surface of the lens was returned to ordinary temperature. Then, the surface of this construction was coated with coating liquid D by spin coating.

The coating conditions were as follows: namely, 5 ml of the coating liquid was applied dropwise from the center of the lens by means of a dropper, and spin coating was performed for 15 seconds at a rotational speed of 500 rpm; then, the lens was dried for 60 seconds at a rotational speed of 2000 rpm. Subsequently, with the convex surface facing upward, the coating was hardened by means of an ultraviolet irradiation device (ECS-151U manufactured by Eyegraphic Co.) with the conveyor speed and lamp height adjusted so that the amount of ultraviolet irradiation was 1000 mJ/cm$^2$. After hardening, dots were marked by means of a lens meter on three points on the convex surface, including one point passing through the optical center of the lens. The subsequent operation was the same as in Embodiment 1.

Embodiment 4

The convex surface side (one side) of an eyeglass lens equipped with an oil-repellent film prepared in the same manner as in Embodiment 1 was coated with coating liquid E by spin coating.

The coating conditions were as follows: namely, 5 ml of the coating liquid was applied dropwise from the center of the lens by means of a dropper while the lens was rotated at a rotational speed of 300 rpm, and this rotation was continued "as is" for 15 seconds; then, the lens was dried for 10 seconds at a rotational speed of 1500 rpm. Subsequently, the lens was heated for 10 minutes in a heating oven at 40° C.; the lens was then removed from the oven, and the surface of the lens was returned to ordinary temperature. Then, dots were marked by means of a lens meter on three points on the convex surface, including one point passing through the optical center of the lens. The subsequent operation was the same as in Embodiment 1.

Comparative Example 3

An eyeglass lens equipped with an oil-repellent film prepared in the same manner as in Embodiment 1 was not subjected to any particular coating treatment, and was subjected to lens edging by the same method as in a conventional technique.

Evaluations of the respective embodiments and comparative examples are shown in Tables 1 and 2. Evaluations were performed for the amount of axial shifting, an ink test, film stripping performance, transmissivity, and durability.

(Amount of Axial Shifting)

Figure 4:
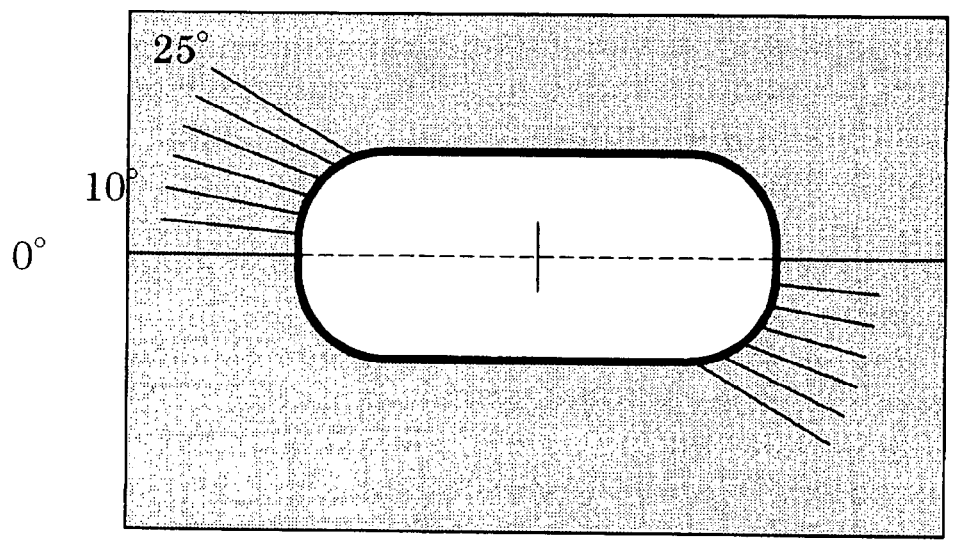
FIG. 4 is a diagram showing an outline of a metal lens frame tool used to check the amount of axial shift.

The amount of axial shifting was measured as follows: after lens edging, the worked lens was placed in a metal lens frame tool of the type shown in FIG. 4, and the amount of shifting of the straight line formed on the concave surface of the lens was measured using a profile projector manufactured by Nikon. The amount of axial shifting by which the lens is shifted from the lens holding mechanism of the working machine during grinding was confirmed by means of this amount of shifting. Evaluation of the amount of shifting was performed as shown below.

○→Axial shifting of 1° or less (including 0°)

Δ→Axial shifting exceeding 1°, but no greater than 2° x→Axial shifting exceeding 2°

(Ink Test)

After working, the two-sided adhesive tape was stripped, and the oil-repellent performance and water-repellent performance were evaluated using Magic Ink (registered trademark). Using Magic Ink #500 (used for fine writing), a line was drawn on the convex surface of the lens from which the two-sided adhesive tape had been stripped, and an evaluation was performed in the following three grades according to the time required for this line to become a point as a result of surface tension.

○→within 5 seconds

Δ→exceeding 5 seconds, but within 10 seconds x→exceeding 10 seconds, or dried without becoming a point (Transmissivity)

The transmissivity for visible light was measured using a spectrophotometer (U-3410 manufactured by Hitachi)

(Film Stripping Performance)

Figure 5:
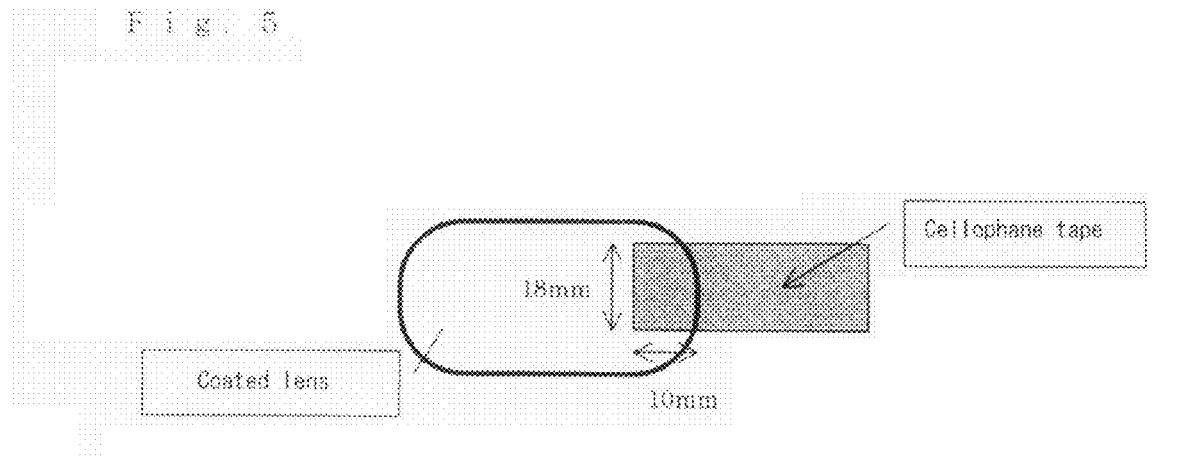
FIG. 5 is a diagram showing the method used for the stripping test of the bonded film.

Following working into an eyeglass frame shape, it is desirable from the standpoint of the eyeglass retail shop that the anti-slip coating film can easily be stripped, and that the adhesive tape be attached to the coating film and peeled from the end surface so that there is no damage such as scratching to the lens surface. Taking this demand into account, a stripping test of the bonded film from the end surface of the coating film was performed using a 10-mm length of Nichiban 405 (width 18 mm) cellophane tape as shown in FIG. 5. The evaluation criteria were as follows:

○→All of the coating film adhering to the lens surface can be stripped in a single operation.

Δ→All of the coating film adhering to the lens surface can be stripped in 2 to 3 operations.

x→Not all of the coating film adhering to the lens surface can be stripped even in more than 3 operations.

(Durability)

For the coated lens, the lens surface was enveloped in an inside paper having cushioning properties, and was placed in a lens paper bag. Three lenses each (total of 39 lenses) ranging from a +6.00 diopter to a +3.00 diopter in 0.25 diopter increments were placed in a box, and the lenses were swung 1000 times each left and right, and up and down. The state of the protective films on the lens surfaces was then investigated. An evaluation was performed as follows:

○→Absolutely no change.

Δ→Scratching seen.

x→Film was stripped from lens surface.

As is seen from Tables 1 and 2, all of the performance values were good in Embodiment 1, Embodiment 2, Embodiment 3, and Embodiment 4. On the other hand, in Comparative Example 1, the stripping performance of the film was poor; this indicates that there are practical problems in that a film in which minute particles are simply applied as a coating tends to be stripped.

In Comparative Example 2, the amount of axial shifting was large; it appears in this case that the adhesion between the oil-repellent coating film and the resin consisting of an organic compound is poor, so that the anchoring effect is weak, thus allowing slipping to occur between the two films. Furthermore, in Comparative Example 3, which is a conventional example, a large amount of axial shifting occurs as described in Background Art.

TABLE 1

| | Coating liquid | Working machine | Amount of axial shift | Ink test | Film stripping performance | Transmissivity (%) | Durability |
|---|---|---|---|---|---|---|---|
| Embodiment 1 | Coating A | SE9090 | ○ | ○ | ○ | 98.1 | ○ |
| Embodiment 1 | Coating A | LE9000 | ○ | ○ | ○ | 97.6 | ○ |
| Embodiment 1 | Coating A | ALE5000 | ○ | ○ | ○ | 98.3 | ○ |
| Embodiment 2 | Coating B | SE9090 | ○ | ○ | ○ | 98.4 | ○ |
| Embodiment 2 | Coating B | LE9000 | ○ | ○ | ○ | 98.5 | ○ |
| Embodiment 2 | Coating B | ALE5000 | ○ | ○ | ○ | 97.7 | ○ |
| Comparative Example 1 | Coating C | SE9090 | Δ | ○ | ○ | 98.4 | x |

TABLE 1-continued

| | Coating liquid | Working machine | Amount of axial shift | Ink test | Film stripping performance | Transmissivity (%) | Durability |
|---|---|---|---|---|---|---|---|
| Comparative Example 1 | Coating C | LE9000 | Δ | ○ | ○ | 98.1 | x |
| Comparative Example 1 | Coating C | ALE5000 | Δ | ○ | ○ | 97.5 | x |
| Comparative Example 2 | Coating D | SE9090 | x | ○ | ○ | 98.3 | ○ |
| Comparative Example 2 | Coating D | LE9000 | x | ○ | ○ | 98.6 | ○ |
| Comparative Example 2 | Coating D | ALE5000 | x | ○ | ○ | 98.5 | ○ |
| Embodiment 3 | Coating C + Coating D | SE9090 | ○ | ○ | ○ | 98.1 | ○ |
| Embodiment 3 | Coating C + Coating D | LE9000 | ○ | ○ | ○ | 98.4 | ○ |
| Embodiment 3 | Coating C + Coating D | ALE5000 | ○ | ○ | ○ | 98.1 | ○ |
| Comparative Example 3 | No coating | SE9090 | x | ○ | — | 98.6 | — |
| Comparative Example 3 | No coating | LE9000 | x | ○ | — | 97.9 | — |
| Comparative Example 3 | No coating | ALE5000 | x | ○ | — | 98.3 | — |

TABLE 2

| | Coating liquid | Working machine | Amount of axial shift | Ink test | Film stripping performance | Transmissivity (%) | Durability |
|---|---|---|---|---|---|---|---|
| Embodiment 4 | Coating E | SE9090 | ○ | ○ | ○ | 98.5 | ○ |
| Embodiment 4 | Coating E | LE9000 | ○ | ○ | ○ | 98.2 | ○ |
| Embodiment 4 | Coating E | ALE5000 | ○ | ○ | ○ | 98.3 | ○ |

The invention claimed is:

1. An eyeglass lens in which an anti-reflection film, an oil-repellent film, and an anti-slip film are formed on the lens surface in that order from the side of the lens surface, and the anti-slip film comprises a first layer which is disposed on the surface of the oil-repellent film, and in which minute particles of a metal oxide or minute particles of a fluoride, or both, are dispersed, and a second layer formed from a resin consisting of an organic compound which is disposed on the surface of the first layer.

2. The eyeglass lens according to claim 1, wherein the surface of the anti-reflection film has fine indentations and projections of 10 nm or less.

3. The eyeglass lens according to claim 1, wherein the mean particle size of the minute particles of a metal oxide and minute particles of a fluoride is 100 nm or less.

4. The eyeglass lens according to claim 1, wherein the metal oxide is a metal oxide of Si, Al, Sn, Sb, Ta, Ce, La, Fe, Zn, W, Zr, In, Ti or Nb, or a complex metal oxide constructed from two or more of these metal oxides.

5. The eyeglass lens according to claim 1, wherein the fluoride is a fluoride of Mg, Al, K, Ca, Ba or Sr, or a complex fluoride constructed from two or more of these fluorides.

6. The eyeglass lens according to claim 1, wherein the resin consisting of an organic compound is one or more resins comprising mainly an acrylic resin, epoxy resin, silicon[e] resin, urethane resin, urea resin, melamine resin, alkyd resin, polyester resin, synthetic rubber, phenol resin, polyvinyl acetal resin, fluorine resin, polyamide resin, unsaturated polyester resin, cellulose polymer, polyalkylene oxide polymer, polyvinyl acetate polymer, styrene/methacrylic acid ester copolymer, or other vinyl (co)polymer.

7. An eyeglass lens in which an anti-reflection film, an oil-repellent film, and an anti-slip film are disposed on the lens surface in that order from the side of the lens surface, and the anti-slip film comprises a mixture of minute particles of a metal oxide or minute particles of a fluoride, or both, and a resin consisting of an organic compound, with this mixture being disposed on the surface of the oil-repellent film.

8. The eyeglass lens according to claim 7, wherein the surface of the anti-reflection film has fine indentations and projections of 10 nm or less.

9. The eyeglass lens according to claim 7, wherein the mean particle size of the minute particles of a metal oxide and minute particles of a fluoride is 100 nm or less.

10. The eyeglass lens according to claim 7, wherein the metal oxide is a metal oxide of Si, Al, Sn, Sb, Ta, Ce, La, Fe, Zn, W, Zr, In, Ti or Nb, or a complex metal oxide constructed from two or more of these metal oxides.

11. The eyeglass lens according to claim 7, wherein the fluoride is a fluoride of Mg, Al, K, Ca, Ba or Sr, or a complex fluoride constructed from two or more of these fluorides.

12. The eyeglass lens according to claim 7, wherein the resin consisting of an organic compound is one or more resins comprising mainly an acrylic resin, epoxy resin, silicon[e] resin, urethane resin, urea resin, melamine resin, alkyd resin, polyester resin, synthetic rubber, phenol resin, polyvinyl acetal resin, fluorine resin, polyamide resin, unsaturated polyester resin, cellulose polymer, polyalkylene oxide polymer, polyvinyl acetate polymer, styrene/methacrylic acid ester copolymer, or other vinyl (co)polymer.

13. An eyeglass lens working method in which the edge portions of an eyeglass lens that has an anti-reflection film formed on the lens surface and that has a coating having oil-repellent properties applied to the surface of this anti-reflection film are worked by a lens edging machine, wherein this method has a step in which an anti-slip thin film is formed on the surface of at least one oil-repellent coating film on the surface of the eyeglass lens by (A) a method in which a coating liquid obtained by having minute particles of a metal oxide or minute particles of a fluoride, or both, dispersed is applied as a coating and dried, and a resin consisting of an organic compound is applied to the surface of this film as a coating and dried, or (b) a method in which a coating liquid comprising a mixture of minute particles of a metal oxide or minute particles of a fluoride, or both, and a resin consisting of an organic compound, is applied as a coating and dried, and the surface of the anti-slip thin film of this eyeglass lens is then set in the lens edging machine with a two-sided adhesive tape interposed.

* * * * *